United States Patent [19]

Hitomi et al.

[11] Patent Number: 5,350,130
[45] Date of Patent: Sep. 27, 1994

[54] SPINNING REEL WITH REMOVABLE COVER

[75] Inventors: Yasuhiro Hitomi, Hashimoto; Noboru Sakaguchi, Tondabayashi; Masuo Ban, Sakai, all of Japan

[73] Assignee: Shimano Inc., Osaka, Japan

[21] Appl. No.: 959,658

[22] Filed: Oct. 13, 1992

[30] Foreign Application Priority Data

Oct. 15, 1991 [JP] Japan .............. 3-083351[U]
Oct. 15, 1991 [JP] Japan .............. 3-083352[U]
Oct. 16, 1991 [JP] Japan .............. 3-083571[U]

[51] Int. Cl.⁵ .............................. A01K 89/00
[52] U.S. Cl. ...................... 242/241; 242/247; 242/283; 242/311
[58] Field of Search .......... 242/241, 311, 321, 283, 242/247

[56] References Cited

U.S. PATENT DOCUMENTS

| | | | |
|---|---|---|---|
| 4,427,162 | 1/1984 | Noda | 242/241 |
| 4,512,531 | 4/1985 | Tunoda | 242/311 X |
| 4,770,363 | 9/1988 | Tsunoda et al. | 242/321 X |
| 4,773,611 | 9/1988 | Kanero | 242/241 |
| 4,821,977 | 4/1989 | Schuster | 242/241 X |
| 4,865,262 | 9/1989 | Tsunoda | 242/241 |
| 5,207,396 | 5/1993 | Furomoto | 242/321 |

FOREIGN PATENT DOCUMENTS

1-168168 11/1989 Japan.

*Primary Examiner*—Daniel P. Stodola
*Assistant Examiner*—Eileen A. Dunn
*Attorney, Agent, or Firm*—Dickstein, Shapiro & Morin

[57] ABSTRACT

A spinning reel comprising a reel body including a rear wall and a side wall, a handle attached to the reel body, a spool connected to a forward portion of the reel body through a spool shaft to be reciprocable fore and aft relative to the reel body, and an oscillating mechanism mounted in the reel body. The oscillating mechanism includes a screw shaft driven by the handle, the screw shaft being insertable into the reel body through the rear wall, a slider engaged with a helical groove formed on the screw shaft and connected to the spool shaft, the slider being operable to convert rotation of the screw shaft to a reciprocating motion in a fore and aft direction of the reel body for transmission to the spool shaft, and guide rods fixed to the reel body for prohibiting displacement of the slider transversely of the screw shaft, the guide rods being insertable into the reel body through the rear wall.

13 Claims, 11 Drawing Sheets

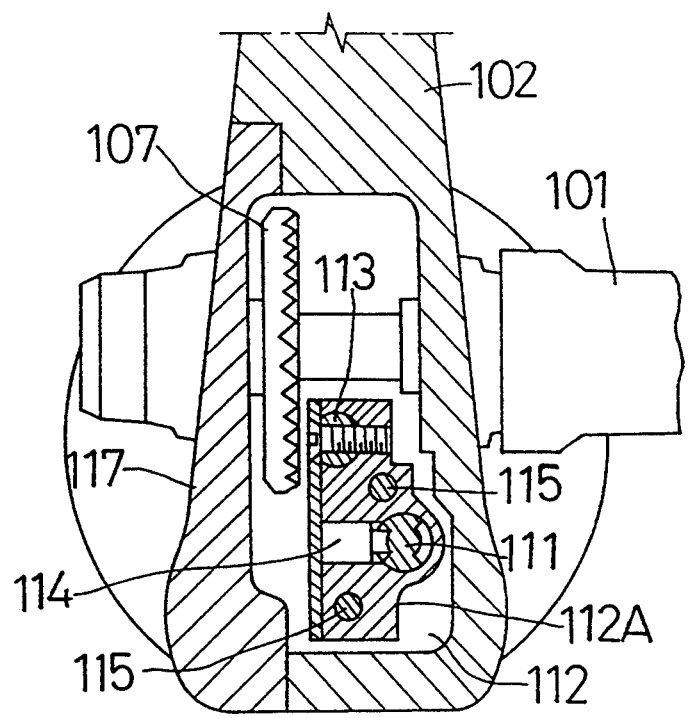
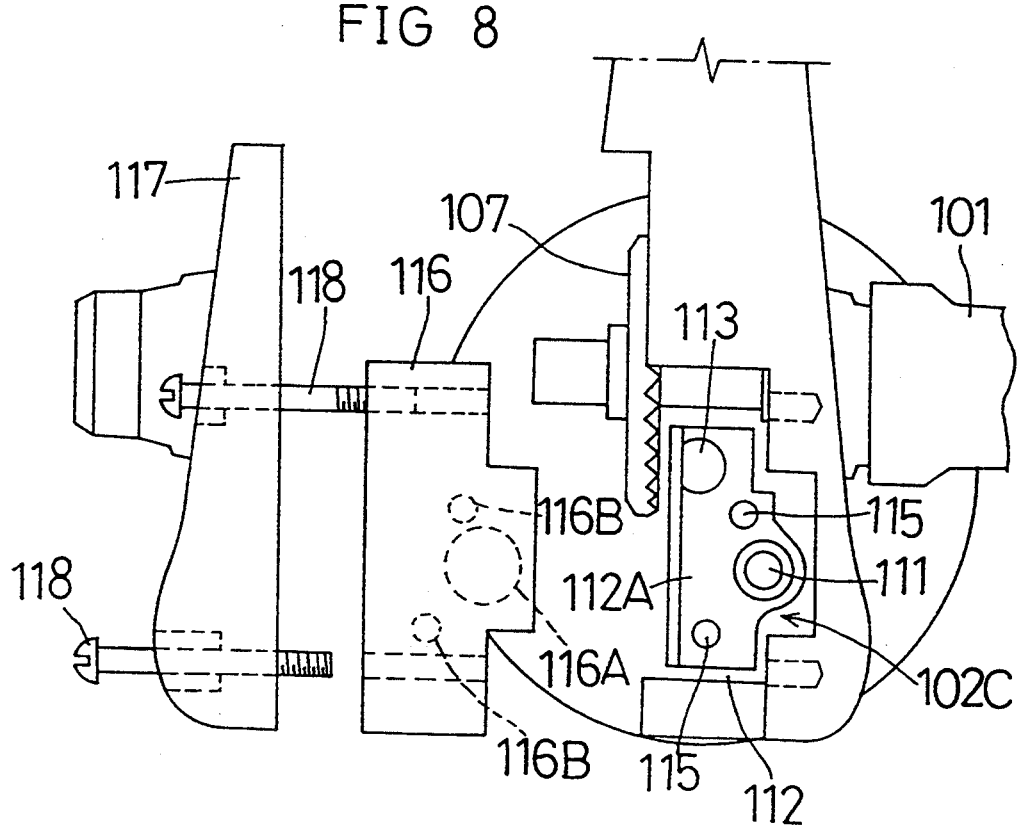

SPINNING REEL WITH REMOVABLE COVER

BACKGROUND OF THE INVENTION

1. Field of the Invention

This invention relates to a spinning reel having a rotor disposed forwardly of a reel body to be driven by a handle, and an oscillating mechanism mounted in a reel body for converting drive from the handle into a reciprocating force for transmission to a spool shaft, the oscillating mechanism including a screw shaft rotatable by the drive from the handle, a slider meshed with a helical groove defined on the screw shaft, and a guide member for guiding movement of the slider in predetermined directions. More particularly, the invention relates to a reel construction for allowing the screw shaft and guide member of the oscillating mechanism to be inserted into the reel body with ease.

2. Description of the Related Art

A spinning reel as constructed above is disclosed in Japanese Utility Model Publication Kokai No. 1989-168168, for example. In this prior construction, the screw shaft is supported at two positions thereof by the reel body, i.e. at a position between an input gear mounted on a forward end of the screw shaft and a portion defining the helical groove and at a rear end of the screw shaft. For assembling the reel, a lid provided laterally of the reel body is opened, and the screw shaft is inserted into the reel body through the lateral opening.

This prior construction has the advantage of supporting the screw shaft rigidly since the screw shaft is supported directly by the reel body. However, the screw shaft must be inserted through the lateral opening of the reel body when assembling the reel. Particularly where, as in this prior construction, a rear end of the screw shaft is fitted into a recess formed in the reel body for simplicity of the reel construction, the screw shaft inserting step inevitably is followed by a troublesome step of moving the screw shaft fore and aft inside the reel body for positional adjustment.

Further, in an actual fishing situation, the spinning reel as attached to a fishing rod is often placed on a concrete surface of a breakwater. Thus, a bottom surface of a rear end region of the reel body is more vulnerable to wear and damage than other parts of the reel body.

SUMMARY OF THE INVENTION

An object of the present invention is to provide an improved spinning reel which allows the screw shaft to be assembled to the reel body with ease, and which assures an enhanced strength for a bottom surface of a rear end region of the reel body.

The above object is fulfilled, according to the present invention, by a spinning reel comprising a reel body including a rear wall and a side wall, a handle attached to the reel body, a spool connected to a forward portion of the reel body through a spool shaft to be reciprocable fore and aft relative to the reel body, and an oscillating mechanism mounted in the reel body, the oscillating mechanism including a screw shaft driven by the handle, the screw shaft being insertable into the reel body through the rear wall, a slider engaged with the screw shaft and connected to the spool shaft, the slider being operable to convert rotation of the screw shaft to a reciprocating motion in a fore and aft direction of the reel body for transmission to the spool shaft, and guide rods fixed to the reel body for prohibiting displacement of the slider transversely of the screw shaft, the guide rods being insertable into the reel body through the rear wall.

In a preferred embodiment of the present invention, as shown in FIGS. 1 and 2, the reel is assembled by inserting the screw shaft into the reel body through a rear opening thereof. After a forward end of the screw shaft is fitted in a support provided inside the reel body, a rear end of the screw shaft is placed in the rear opening. This opening is closed by a rear cover to prevent the screw shaft from falling off rearwardly. The rear cover extends over and reinforces a rear surface and a bottom surface of the reel body.

Thus, according to the present invention, the screw shaft is not inserted into the reel body through a lateral opening thereof, but rather is inserted in a posture in which the screw shaft will remain inside the reel body, i.e. inserted by axial movement. The reel may therefore be assembled in a twist-free manner without requiring a large opening to be formed laterally of the spinning reel. The rear cover for retaining the screw shaft in place acts also to protect the reel body from damage due to wear and other causes.

Thus, the present invention provides an improved spinning reel which allows the screw shaft to be assembled to the reel body with ease, and which assures an enhanced strength for a bottom surface of a rear bottom region of the reel body.

Other objects and features of this invention will be understood from the following description taken with reference to the accompanying drawings.

BRIEF DESCRIPTION OF THE DRAWINGS

FIG. 7 is a rear view in vertical section of a center portion of a reel body in the second embodiment.

FIG. 8 is a rear view showing the second embodiment with a closure member detached.

DETAILED DESCRIPTION OF THE PREFERRED EMBODIMENTS

A first embodiment of the present invention will be described hereinafter with reference to the drawings.

Figure 1:
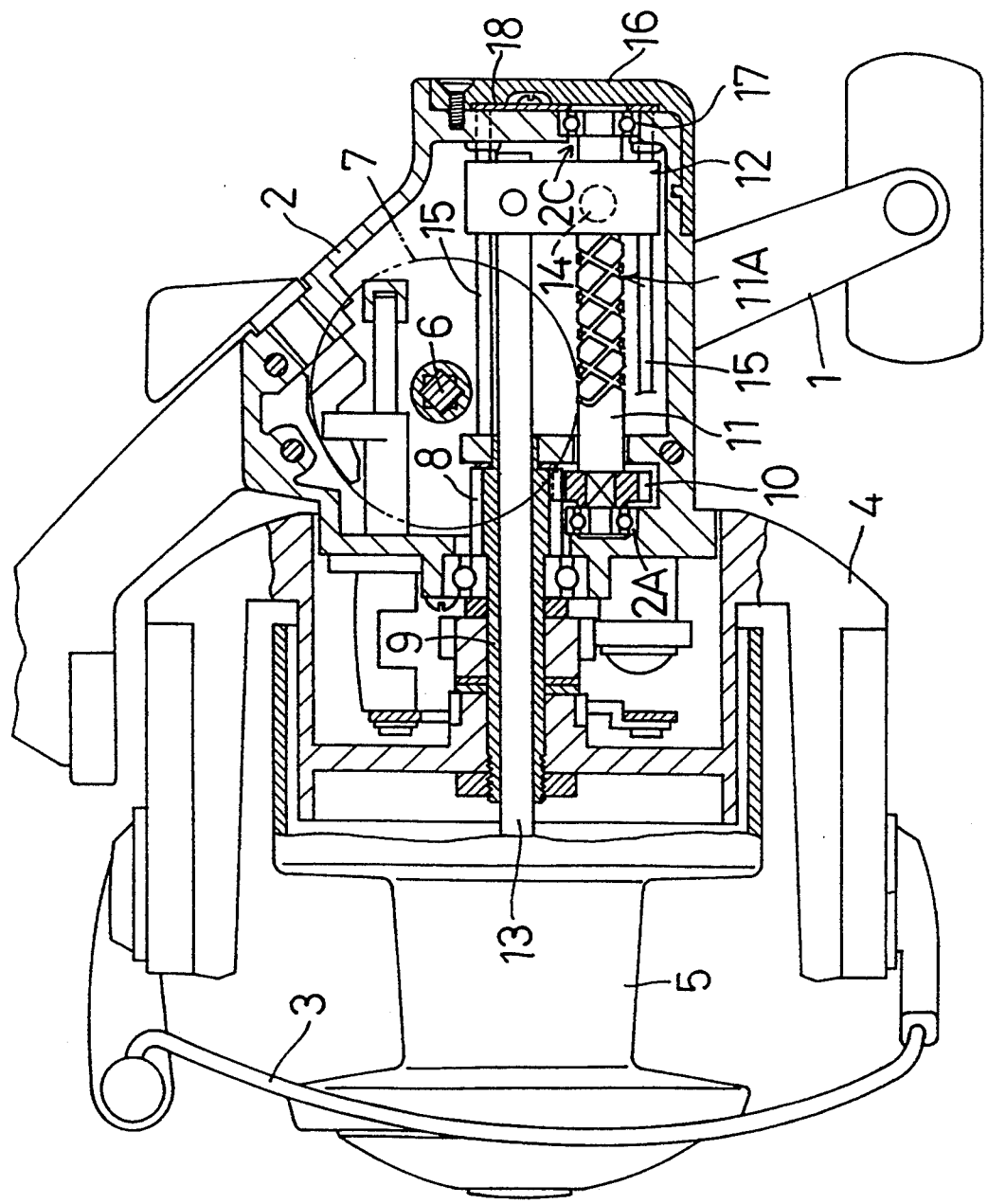
FIG. 1 is a side view, partly broken away, of a spinning reel in a first embodiment of the invention.

As shown in FIG. 1, a spinning reel includes a handle 1 attached to a reel body 2, a rotor 4 carrying a bail arm 3 and mounted on a forward portion of the reel body 2, and a spool 5 connected to the forward portion of the reel body 2. The spinning reel further includes a drive line for transmitting drive from a drive gear 7 rotatable by a handle shaft 6 to the rotor 4 through a pinion gear 8 and a sleeve shaft 9, and another drive line having an oscillating mechanism which converts drive from the pinion gear 8 into a reciprocal motion for transmission to a spool shaft 13. The oscillating mechanism includes an input gear 10, a screw shaft 11 and a slider 12.

Figure 4:
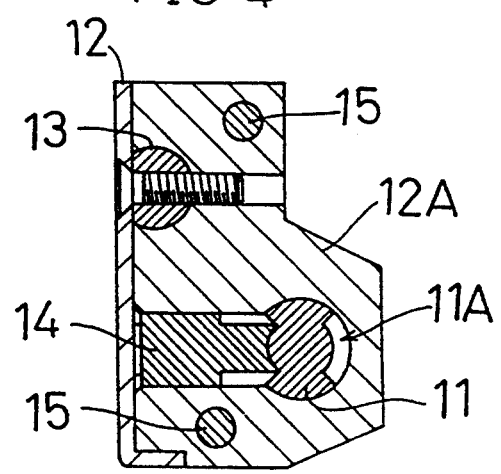
FIG. 4 is a sectional view of a slider in the first embodiment.

As shown in FIG. 4, the slider 12 includes a slide element 12A containing an insert piece 14 engaging a helical groove 11A defined on the screw shaft 11. The slide element 12A is supported and guided by a pair of upper and lower guide rods 15 to be slidable parallel to the spool shaft 13. This reel has a construction for facilitating assembly and disassembly of the oscillating mechanism as described hereunder.

Figure 2:
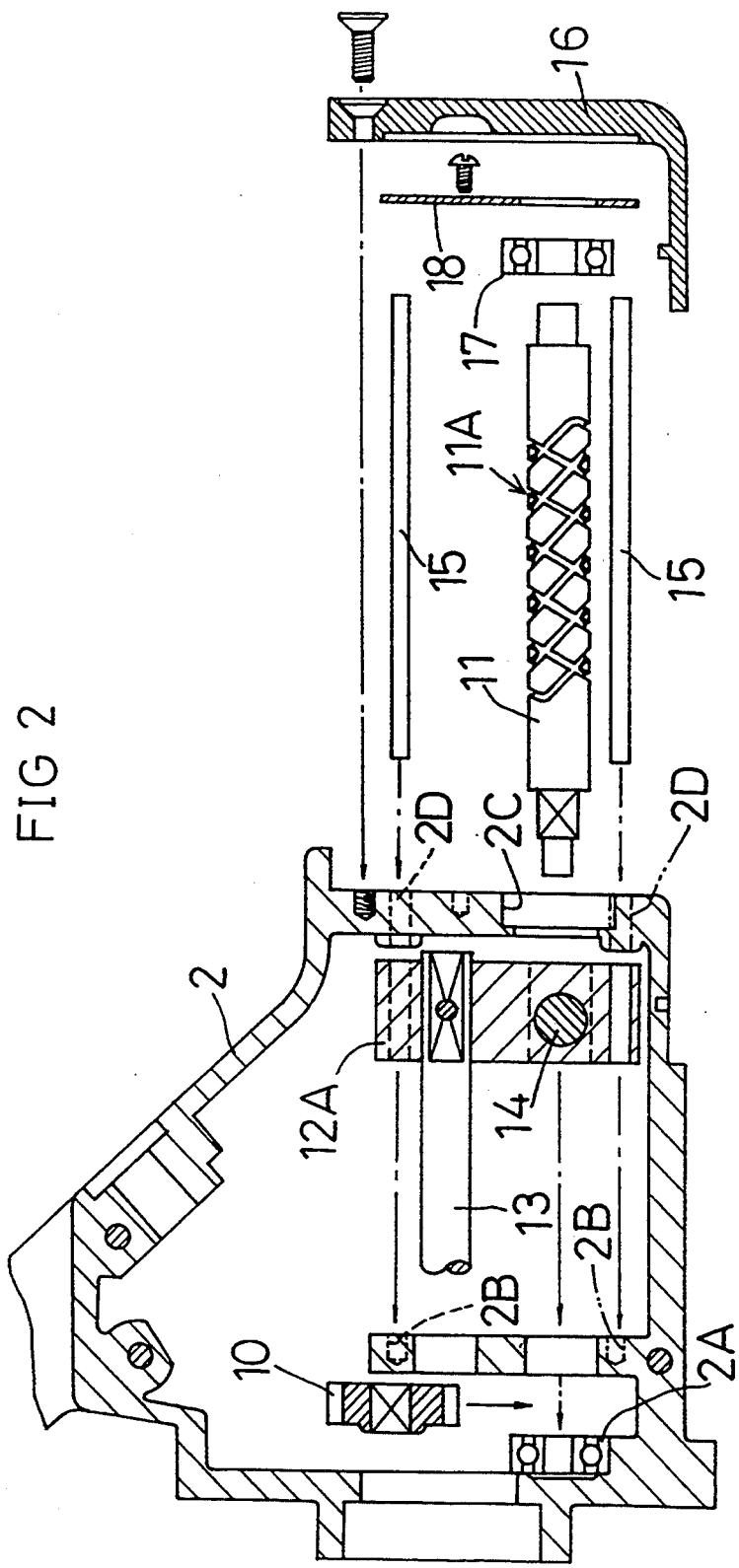
FIG. 2 is an exploded side view of an oscillating mechanism in the first embodiment.
Figure 3:
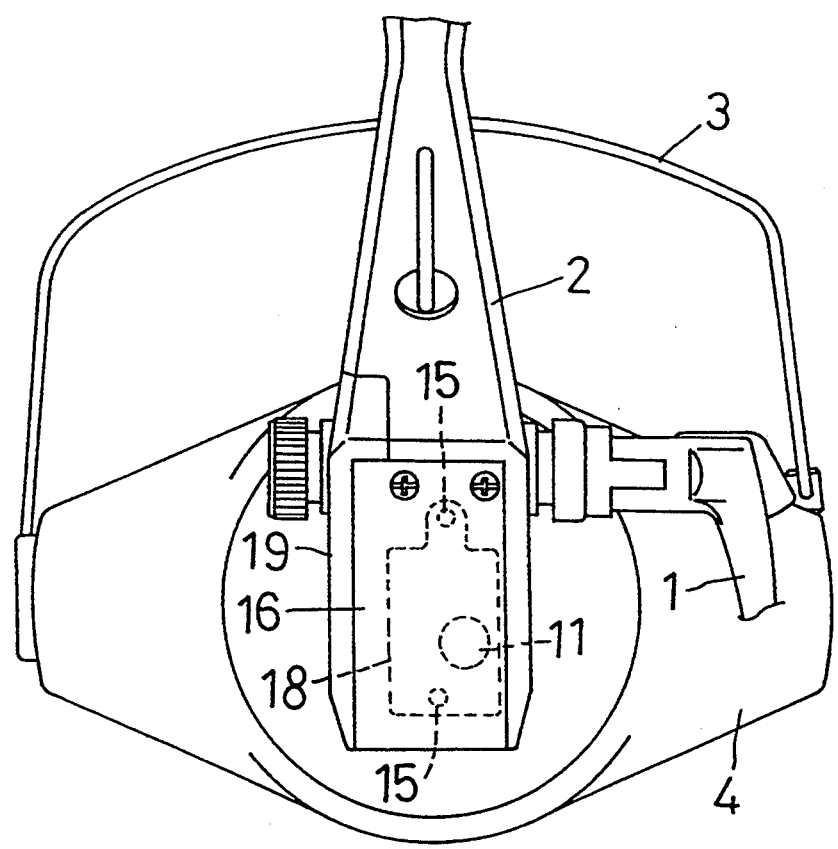
FIG. 3 is a rear view of the spinning reel in the first embodiment.

As shown in FIGS. 1 through 3, the reel body 2 has an opening 2C defined in a rear end region thereof for allowing the screw shaft 11 to be inserted forwardly into the reel body 2, and bores 2D also defined in the rear end region for receiving and supporting the guide rods 15 inserted forwardly into the reel body 2. Further, the reel body 2 includes a support 2A (in the form of a ball bearing) for supporting a forward end of the screw shaft 11 inserted into the reel body 2, and supports 2B for engaging and supporting forward ends of the guide rods 15. The opening 2C and bores 2D are closed by a rear cover 16 detachably attached to the reel body 2 and extending from a rear surface to a bottom surface thereof.

When assembling the oscillating mechanism, the screw shaft 11 and guide rods 15 are inserted into the reel body 2 through the rear opening 2C and bores 2D, respectively, and a ball bearing 17 is inserted to support a rear end of the screw shaft 11. Then, a retainer 18 is fastened by screws to hold the bearing 17 and guide rods 15 against slipping off rearwardly. Finally, the cover 16 is fastened by screws.

The input gear 10 of the oscillating mechanism may be fitted on the screw shaft 11 when the latter is inserted into the reel body 2. A side cover 19, which may be opened, is provided laterally of the reel body 2. The rear cover 16 serves to protect a region extending from a rear surface to a bottom surface of the side cover 19, and to hold the side cover 19 in a closed position.

The covers may be formed of a plastic, metallic or any other material.

The screw shaft 11 may be supported through bushes or the like instead of the bearings.

The above embodiment may be modified without departing from the gist of the invention, such as by holding the screw shaft in place by using the rear cover itself, thereby to dispense with the retainer.

A second embodiment of the present invention will be described next with reference to the drawings.

Figure 5:
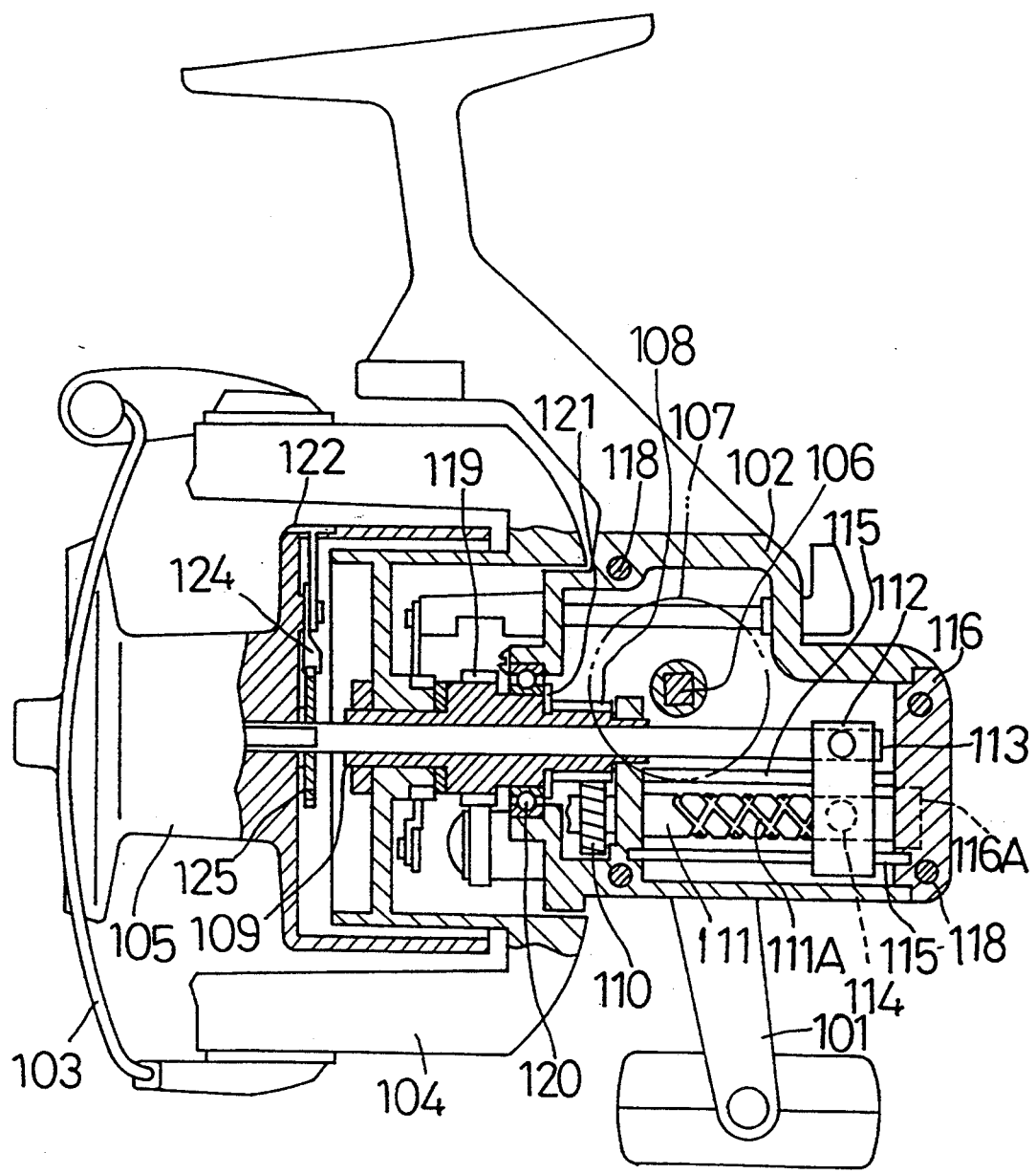
FIG. 5 is a side view, partly broken away, of a spinning reel in a second embodiment of the invention.
Figure 6:
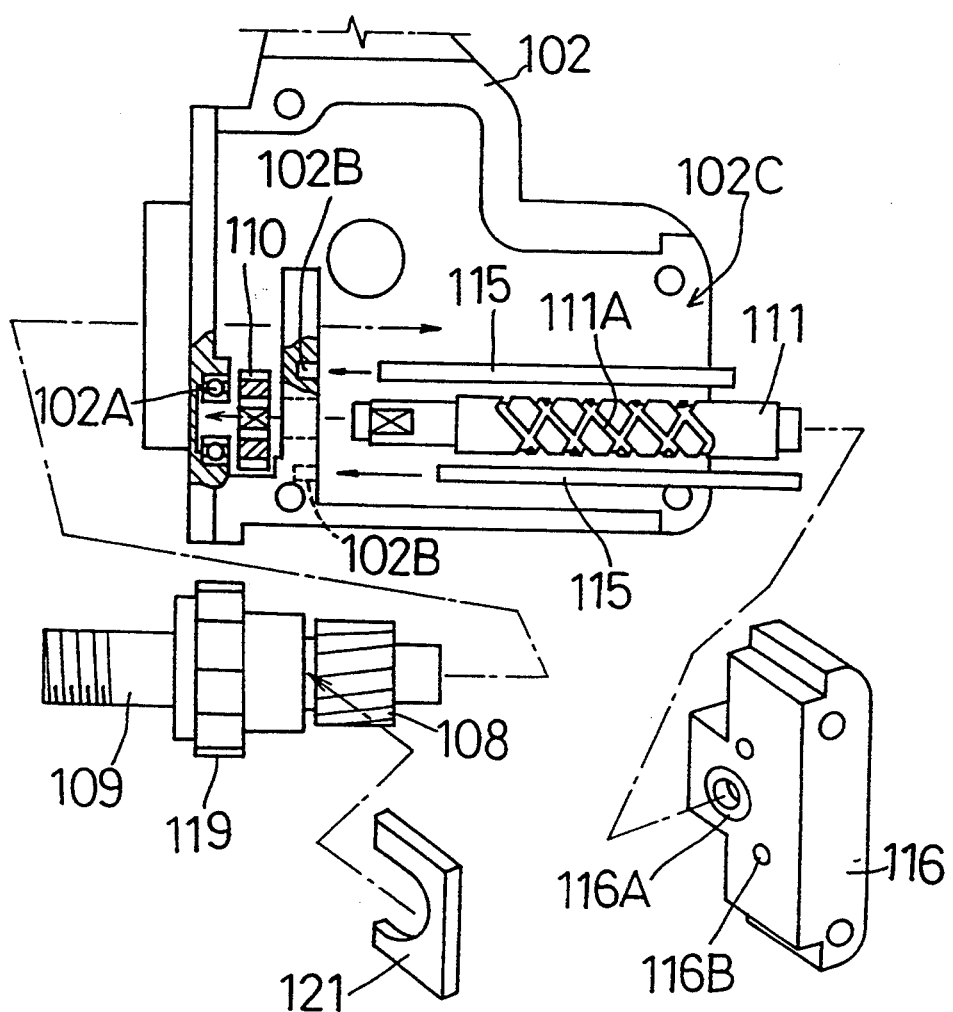
FIG. 6 is a side view showing how a screw shaft is assembled in the second embodiment.

As shown in FIG. 5, a spinning reel in the second embodiment, as in the first embodiment, includes a handle 101 attached to a reel body 102, a rotor 104 carrying a bail arm 103 and mounted on a forward portion of the reel body 102, and a spool 105 connected to the forward portion of the reel body 102. The spinning reel further includes a drive line for transmitting drive from a drive gear 107 rotatable by a handle shaft 106 to the rotor 104 through a pinion gear 108 and a sleeve shaft 109, and another drive line having an oscillating mechanism which converts drive from the pinion gear 108 into a reciprocal motion for transmission to a spool shaft 113. The oscillating mechanism includes an input gear 110, a screw shaft 111 and a slider 112.

As shown in FIGS. 5 and 7, the slider 112 includes a slide element 112A containing an insert piece 114 engaging a helical groove 111A defined on the screw shaft 111. The slide element 112A is supported and guided by a pair of upper and lower guide rods 115 to be slidable parallel to the spool shaft 113. This reel has a construction for facilitating assembly and disassembly of the oscillating mechanism as described hereunder.

As shown in FIGS. 5 through 8, the reel body 102 has a rear wall thereof acting as a rear cover 116 detachable to provide an opening 102C for allowing the screw shaft 111 and guide rods 115 to be inserted forwardly into the reel body 102. Further, the reel body 102 includes a support 102A (in the form of a ball bearing) for supporting a forward end of the screw shaft 111 inserted into the reel body 102, and supports 102B for engaging and supporting forward ends of the guide rods 115.

The rear cover 116 includes a bearing portion 116A (in the form of a ball bearing) for supporting a rear end of the screw shaft 111, and recessed supports 116B for engaging and supporting rear ends of the guide rods 115.

When assembling the oscillating mechanism, the screw shaft 111 and guide rods. 115 are inserted into the reel body 102 through the rear opening 102C, and the mar cover 116 is fitted in the rear opening 102C to support the screw shaft 111 and guide rods 115. In this state, a lid 117 is fixed to one side of the reel body 102 by means of screws 118 which also fasten the rear cover 116 to the reel body 102.

The oscillating mechanism may be disassembled by reversing the above sequence.

This reel further includes a ratchet wheel 119 formed integral with the sleeve shaft 109 for preventing backward rotation of the rotor 104. The sleeve shaft 109 has a slightly larger outside diameter than the pinion gear 108. An annular groove is formed in a forward position of the pinion gear 108. When assembling the sleeve shaft 109 to the reel body 102, the sleeve shaft 109 is inserted along with a bearing 120 from the forward end of tile reel body 102, with a retainer 121 fitted in the annular groove. Thus, there is no need to effect the sleeve shaft inserting operation from inside the reel body 102.

Figure 9:
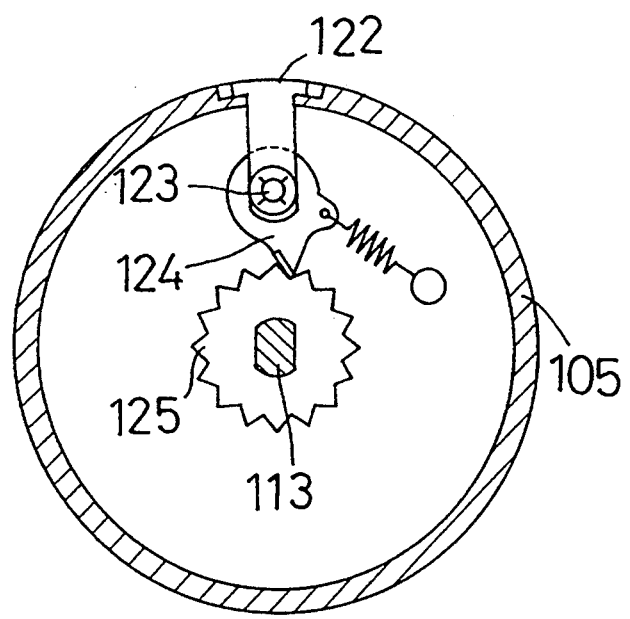
FIG. 9 is a rear view in vertical section of a spool in the second embodiment.
Figure 10:
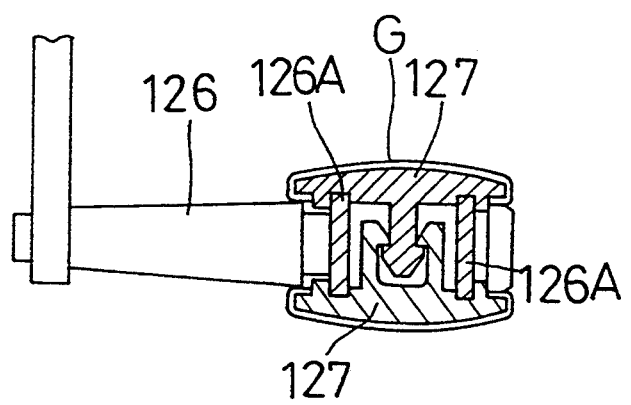
FIG. 10 is a view in vertical section of a handle grip in the second embodiment.

As shown in FIG. 9, the spool 105 includes a line grip 122 fixable in place by a shaft 123 which acts also as a support shaft for a clicking sound producing pin 124. When the spool 105 is rotated, the pin 124 flips on a toothed spool stopper 125 to produce a clicking sound. Further, as shown in FIG. 10, the handle 101 includes a grip G having a core 126A formed integral with a shaft 126 and sandwiched between soft elements 127.

This embodiment may be modified without departing from the gist of the invention, such as by providing a circular or other opening in the rear of the reel body. The rear opening may be closed by a rear cover fastened by screws or other means independently of the side cover.

Figure 11:
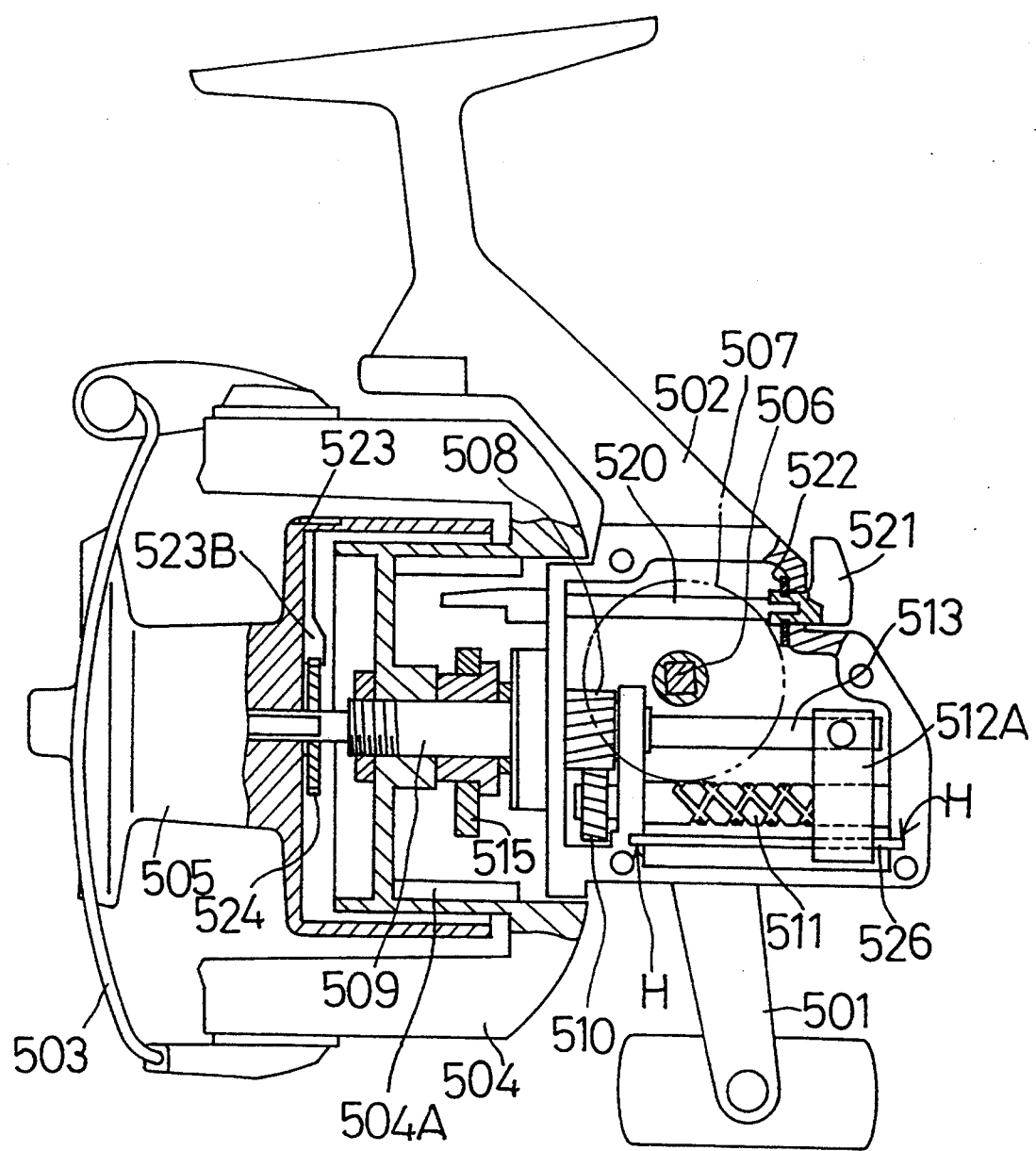
FIG. 11 is a side view, partly broken away, of a third embodiment of a spinning reel according to the present invention, with a control lever and a guide member fixed by a side cover.
Figure 12:
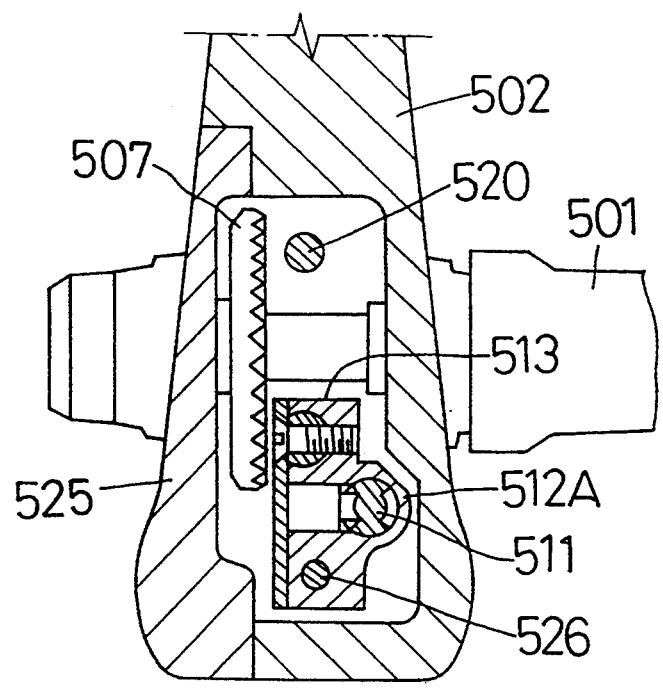
FIG. 12 is a rear view in vertical section of a central portion of a reel body of the reel shown in FIG. 11.
Figure 13:
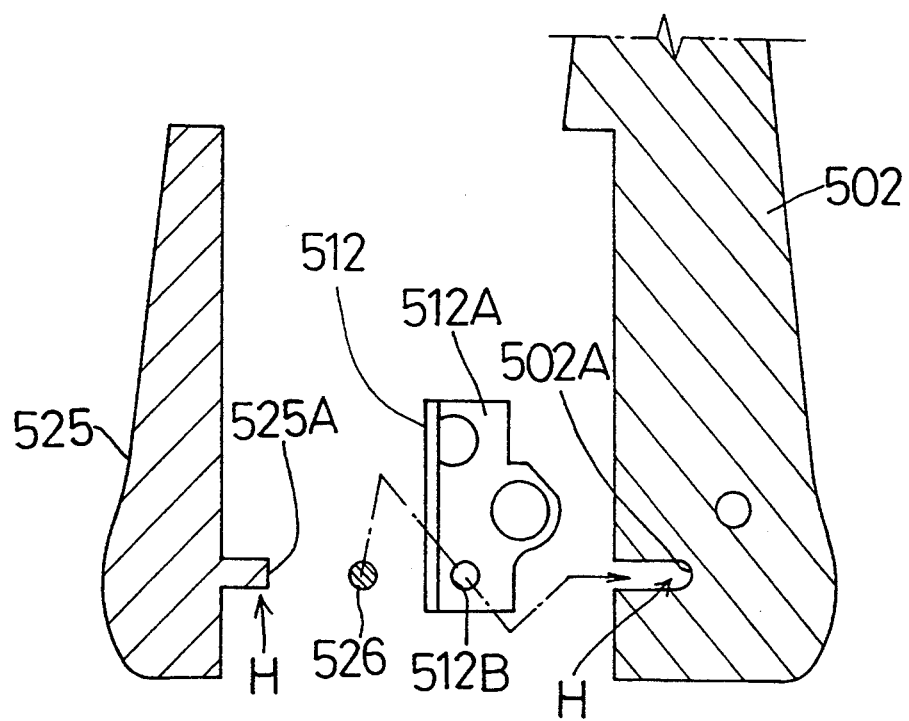
FIG. 13 is a rear view in vertical section of a rear portion of the reel body of the reel shown in FIG. 11.

As shown in FIGS. 11 through 13, a spinning reel may include a reel body 502 having a lid 525 for closing a lateral opening thereof. The reel body 502 includes a guide rod 526 extending parallel to a spool shaft 513 and penetrating a bore 512B formed in a slider 512 for guiding the slider 512. The guide rod 526 is fixed at opposite ends thereof to supports H each consisting of a recess 502A formed in the reel body 502 and a projection 525A formed on an inner wall of the lid 525.

When assembling the guide rod 526 to the reel body 502, the lid 525 is opened, the guide rod 526 is fitted in the recesses 502A, and thereafter the lid 525 is closed. This simple operation enables the guide rod 526 to be secured between the projections 525A of the lid 525 and the recesses 502A of the reel body 502. FIG. 13 shows only the structure for supporting the rear end of the guide rod 526. A similar structure is provided for the forward end of the guide rod 526. The guide rod 526 is removable only by opening the lid 525. A plurality of guide rods 526 may of course be provided. The guide rod or rods may be adapted to contact an outer surface or surfaces of a slide element 512A of the slider 512.

As shown in FIG. 11, this spinning reel include a handle 501 attached to the reel body 502, a rotor 504 carrying a bail arm 503 and mounted on a forward portion of the reel body 502, and a spool 505 connected to the forward portion of the reel body 502. The spinning reel further includes a drive line for transmitting drive from a drive gear 507 rotatable by a handle shaft 506 to the rotor 504 through a pinion gear 508 and a sleeve shaft 509, and another drive line having an oscillating mechanism which converts drive from the pinion gear 508 into a reciprocal motion for transmission to a spool shaft 513. The oscillating mechanism includes an input gear 510, a screw shaft 511 and the slider 512.

Figure 14:
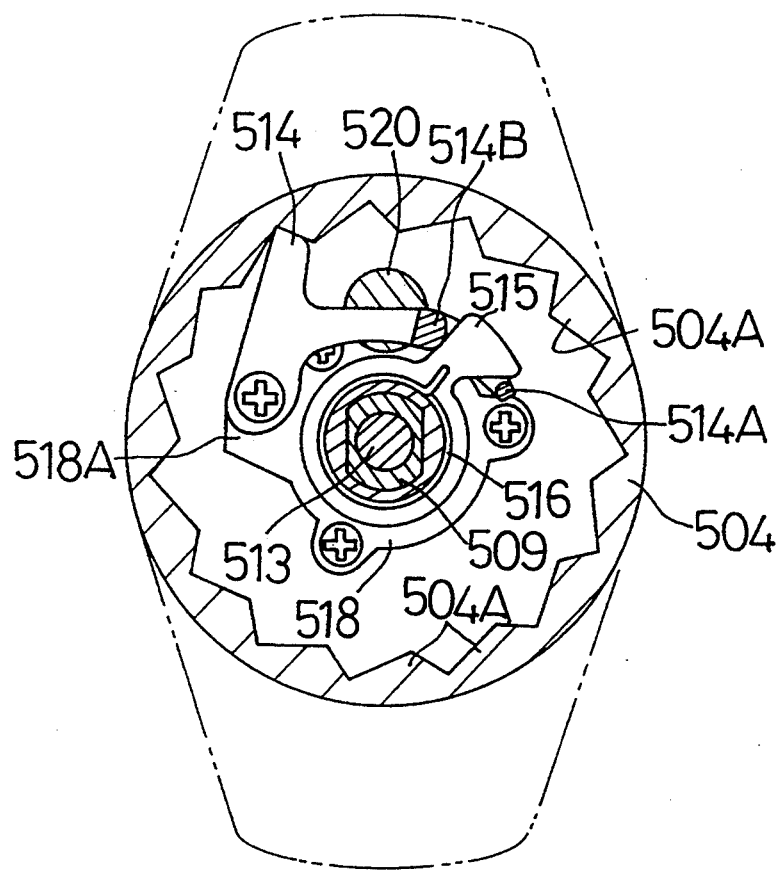
FIGS. 14 and 15 are a front view of a one-way clutch applicable to a spinning reel according to the present invention, and a front view of a forward portion of a reel body of the reel employing this one-way clutch.
Figure 15:
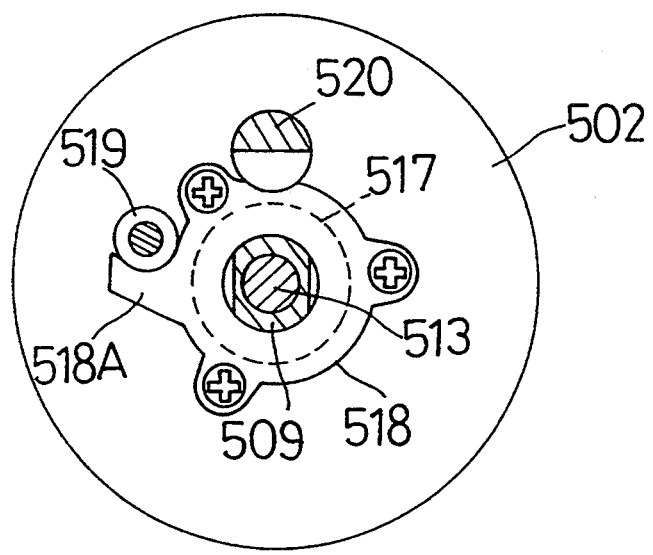

As shown in FIG. 14, the rotor 504 contains a one-way clutch including a plurality of teeth 504A formed on an inner peripheral wall of the rotor 504, a pawl 514 for engaging the teeth 504A, and a cam 515 for controlling the pawl 514. When the rotor 504 is rotated in a direction to wind a fishing line, the cam 515 receives torque from a spring 516 contacting an element rotatable with the sleeve shaft 509. As a result, an inclined surface of the cam 515 contacts a contact portion 514A of the pawl 514, whereby the pawl 514 is moved away from the teeth 504A. When the rotor 504 is rotated in a direction to unwind the fishing line, the cam 515 is operated in the opposite direction. Then, the cam 515 contacts a contact portion 514B of the pawl 514, whereby the pawl 514 engages the teeth 504A to prevent backward rotation of the rotor 504.

The pawl 514 is supported on a shaft 519 which is contacted and reinforced by a projection 518A formed on a presser plate 518 acting on a bearing 517 supporting the sleeve shaft 509. The pawl 514 may forcibly be retracted from the tooth-engaging position by a control shaft 520. This control shaft 520 may be assembled by insertion through a forward end of the reel body 502. As shown in FIG. 11, a control lever 521 is fitted on a rear end of the control shaft 520 and prevented from falling off the control shaft 520 by a retainer piece 522. This retainer piece 522 also is fixed in place through contact with an inner wall of the lid 525.

Figure 16:
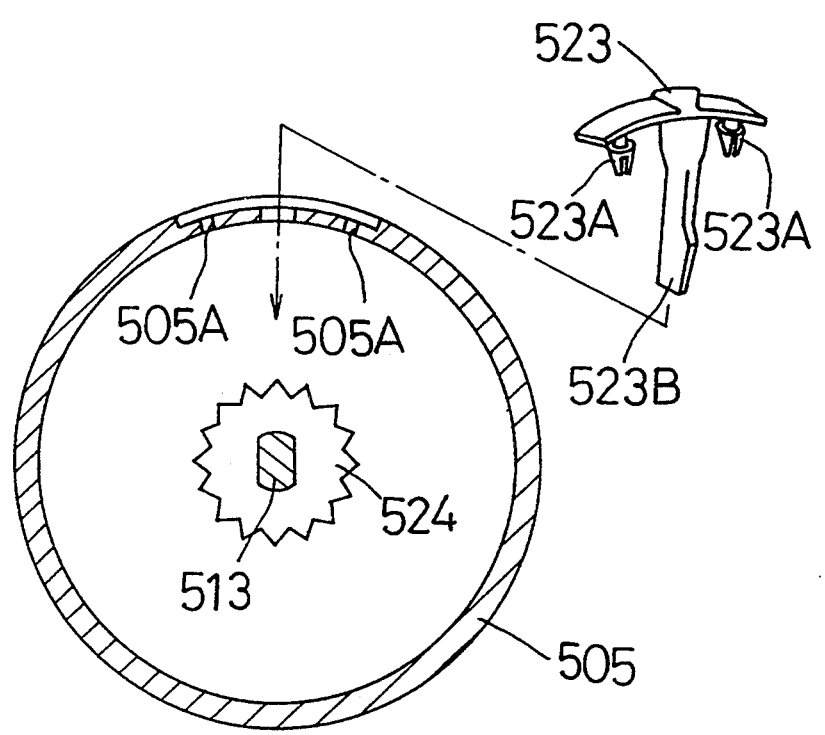
FIG. 16 is a schematic view of a sound producing mechanism and a line grip applicable to the spinning reel according to the present invention.

As shown in FIG. 16, the spool 505 includes a line grip 523 having a pair of projections 523A extending into bores 505A formed in the spool 505 to fix the line grip 523 in place. The line grip 523 also has a clicking sound producing piece 523B formed integral therewith. The sound producing piece 523B contacts peripheries of a toothed sound producing disc 524 mounted on the spool shaft 513.

What is claimed is:

1. A spinning reel comprising: a reel body including a rear opening, a rear wall and a side wall;
   a handle attached to said reel body;
   a spool connected to a forward portion of said reel body through a spool shaft and means for reciprocating said spool shaft fore and aft relative to said reel body, said means for reciprocating comprising an oscillating mechanism mounted in said reel body and including:
   a screw shaft driven by said handle, said screw shaft being inserted into said reel body through said rear opening and supported by said rear wall;
   a slider engaged with said screw shaft and connected to said spool shaft, said slider being operable to convert rotation of maid screw shaft to a reciprocating motion of a fore and aft direction of said reel body for transmission to said spool through said spool shaft; and
   guide means fixed to said reel body for prohibiting displacement of said slider transversely of said screw shaft, said guide means being inserted into said reel body through said rear opening and supported by said rear wall.

2. A spinning reel as claimed in claim 1, wherein said rear wall includes a support portion fitting with said screw shaft and said guide means to prohibit transverse displacement of said screw shaft and said guide means, said support portion allowing insertion into said reel body of said screw shaft and said guide means.

3. A spinning reel as claimed in claim 2, wherein said support portion includes a bearing through which said screw shaft is supported by said reel body.

4. A spinning reel as claimed in claim 3, further comprising a rear cover detachably attached to said rear wall for prohibiting movement rearwardly of said reel body of said screw shaft, said bearing and said guide means.

5. A spinning reel as claimed in claim 4, further comprising a retainer mounted between said rear wall and said rear cover, said rear cover acting through said retainer to prohibit movement rearwardly of said reel body of said screw shaft, said bearing and said guide means.

6. A spinning reel as claimed in claim 4, wherein said reel cover extends from said rear wall to a bottom wall of said reel body.

7. A spinning reel as claimed in claim 4, wherein said rear cover is formed of a metal.

8. A spinning reel as claimed in claim 1, wherein said rear wall is detachable from said reel body to allow insertion into said reel body of said screw shaft and said guide means, said rear wall including a support portion for supporting said screw shaft and said guide means.

9. A spinning reel as claimed in claim 8, wherein said support portion includes a bearing through which said screw shaft is supported by said rear wall.

10. A spinning reel as claimed in claim 8, wherein said reel wall extends from a rear region to a bottom region of said reel body.

11. A spinning reel as claimed in claim 8, wherein said rear wall is formed of a metal.

12. A spinning reel as claimed in claim 8, wherein said rear wall and said side wall are simultaneously fixable to said reel body.

13. A spinning reel as claimed in claim 1, wherein said slider includes an insert tab to engage the screw shaft.

* * * * *